Feb. 13, 1962 F. S. LAPEYRE ET AL 3,020,583
APPARATUS FOR SEPARATING SHRIMP FROM A MIXED CATCH
AND/OR REMOVING THE SHRIMP HEADS
Filed Sept. 23, 1957 4 Sheets-Sheet 1
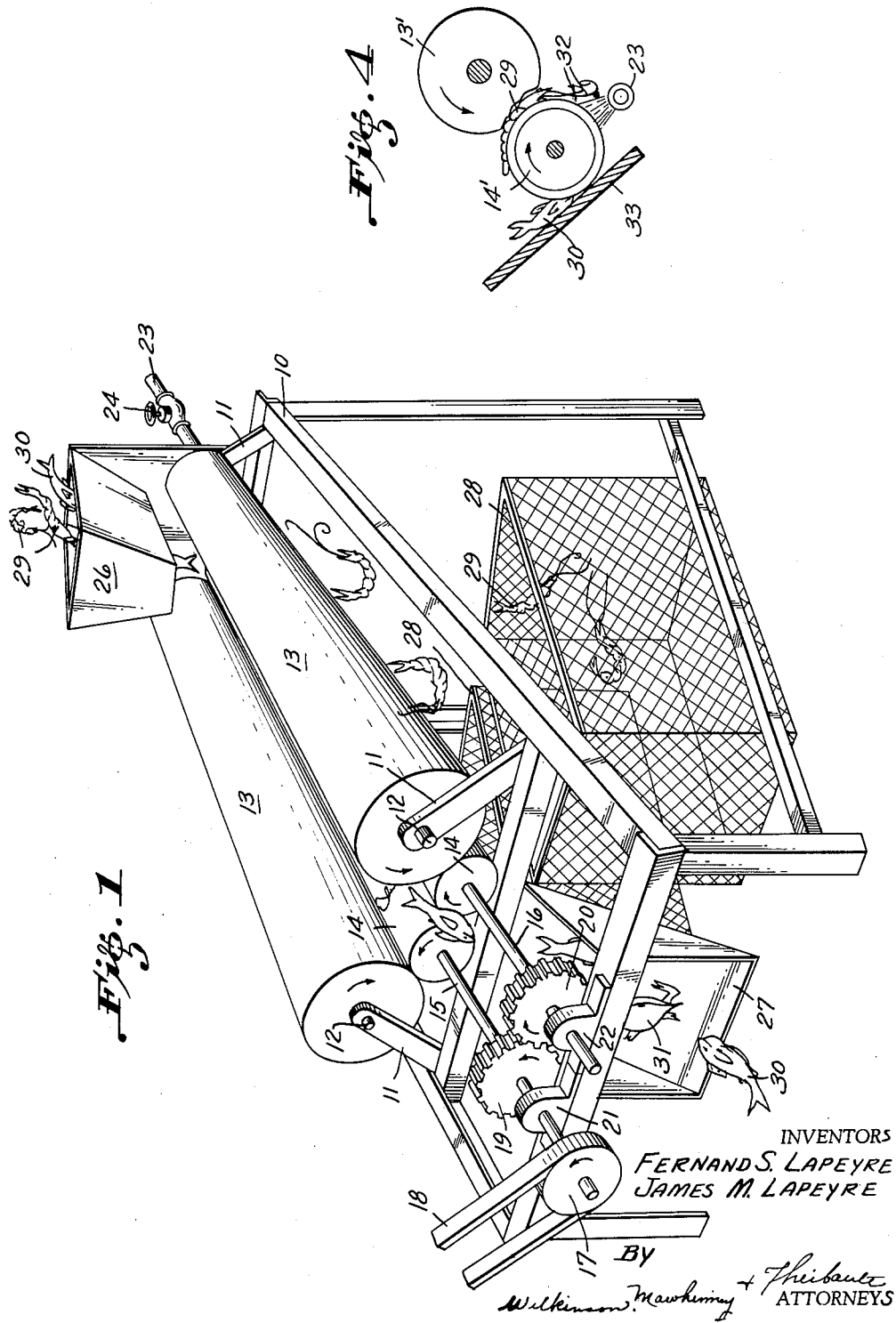
INVENTORS
FERNAND S. LAPEYRE
JAMES M. LAPEYRE
BY
Wilkinson, Mawhinney + Thibault
ATTORNEYS Feb. 13, 1962   F. S. LAPEYRE ET AL   3,020,583
APPARATUS FOR SEPARATING SHRIMP FROM A MIXED CATCH
AND/OR REMOVING THE SHRIMP HEADS
Filed Sept. 23, 1957   4 Sheets-Sheet 2
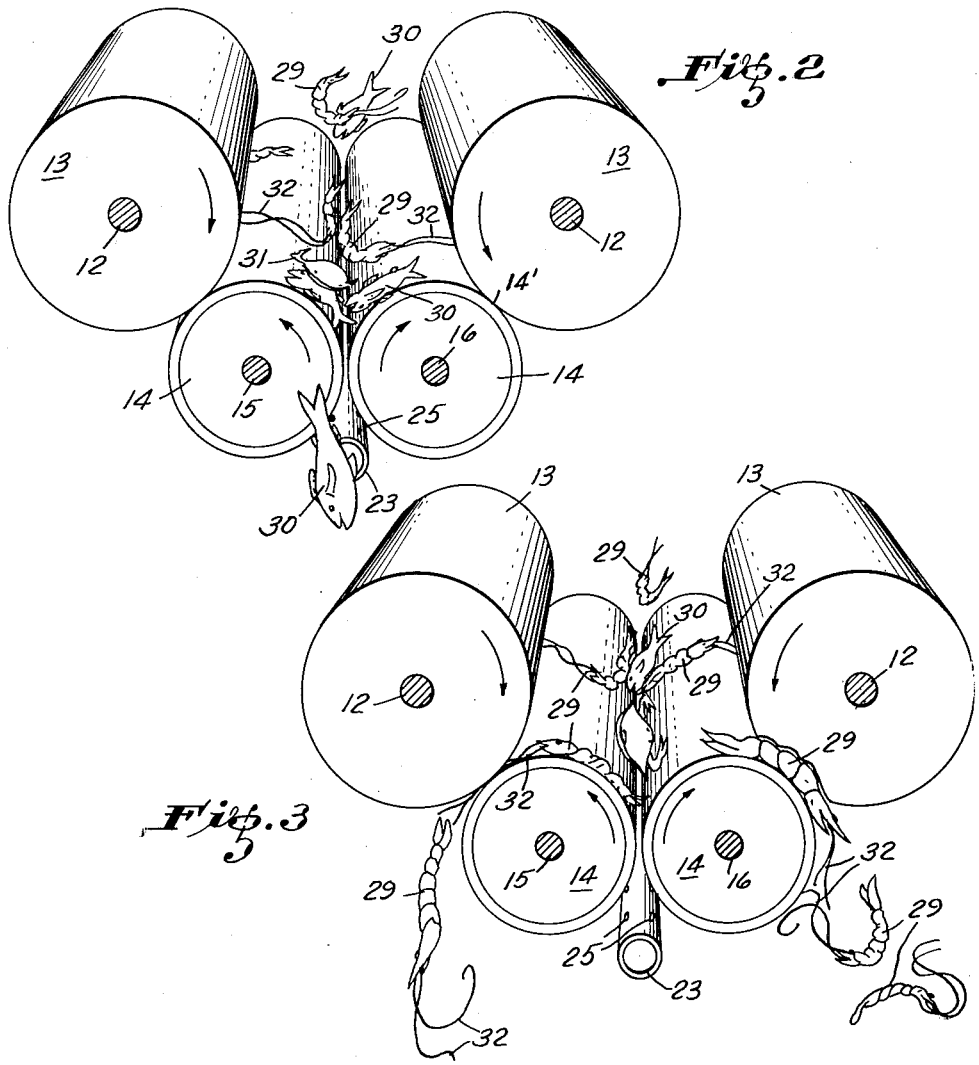
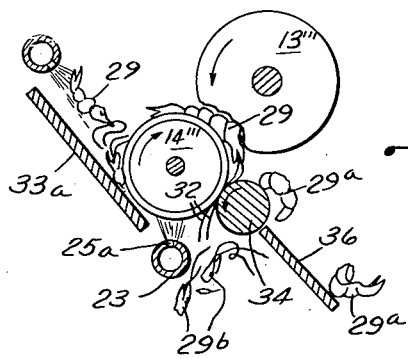
INVENTORS
FERNAND S. LAPEYRE
JAMES M. LAPEYRE
BY Wilkinson, Mawhinney & Thibault
ATTORNEYS

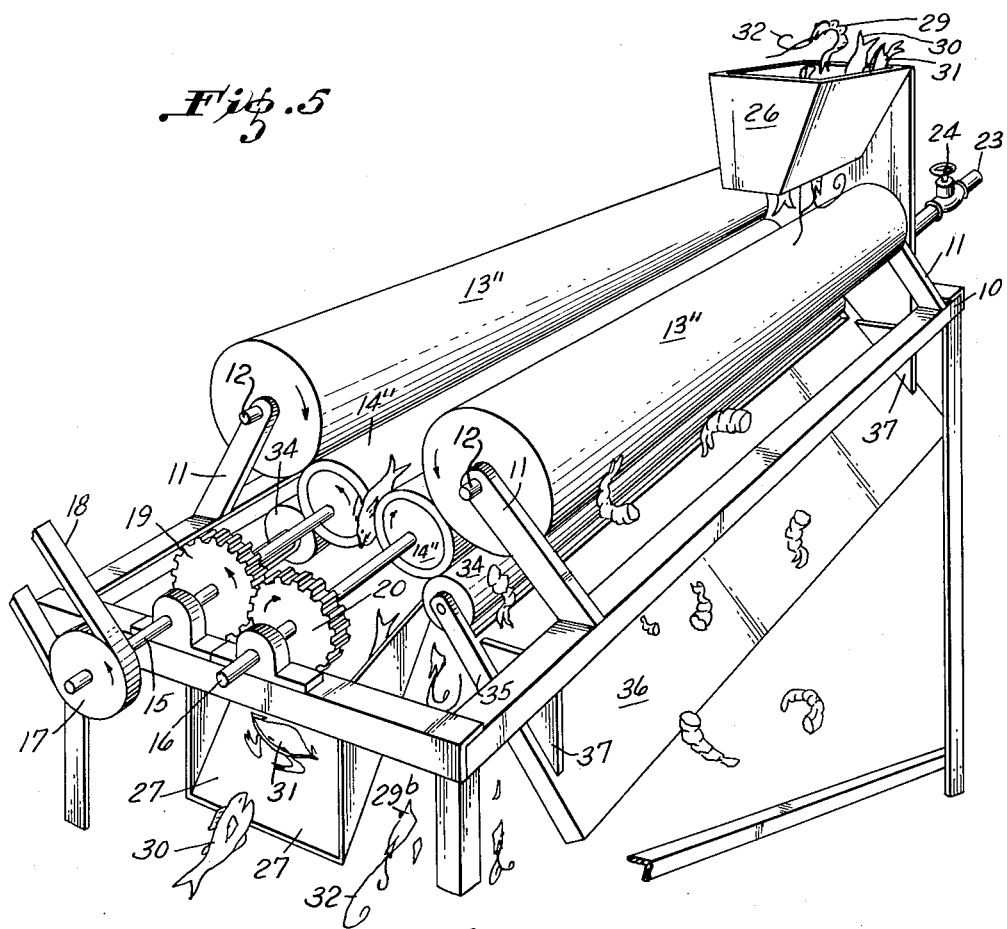
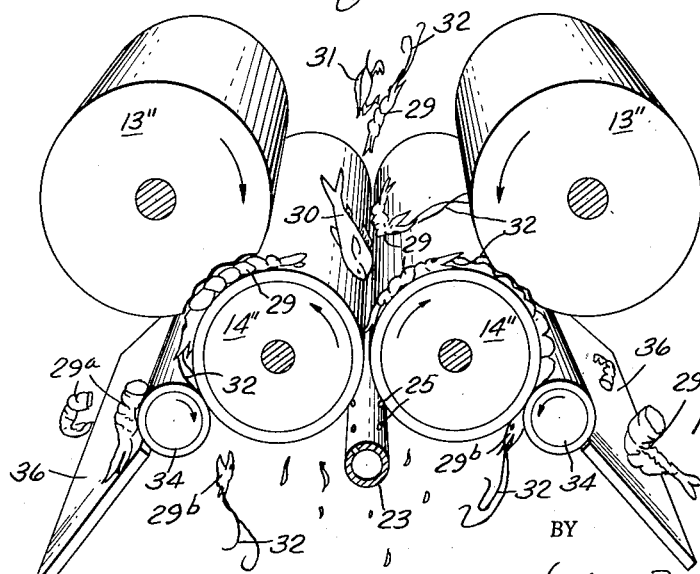

Feb. 13, 1962 F. S. LAPEYRE ET AL 3,020,583
APPARATUS FOR SEPARATING SHRIMP FROM A MIXED CATCH
AND/OR REMOVING THE SHRIMP HEADS
Filed Sept. 23, 1957 4 Sheets-Sheet 4
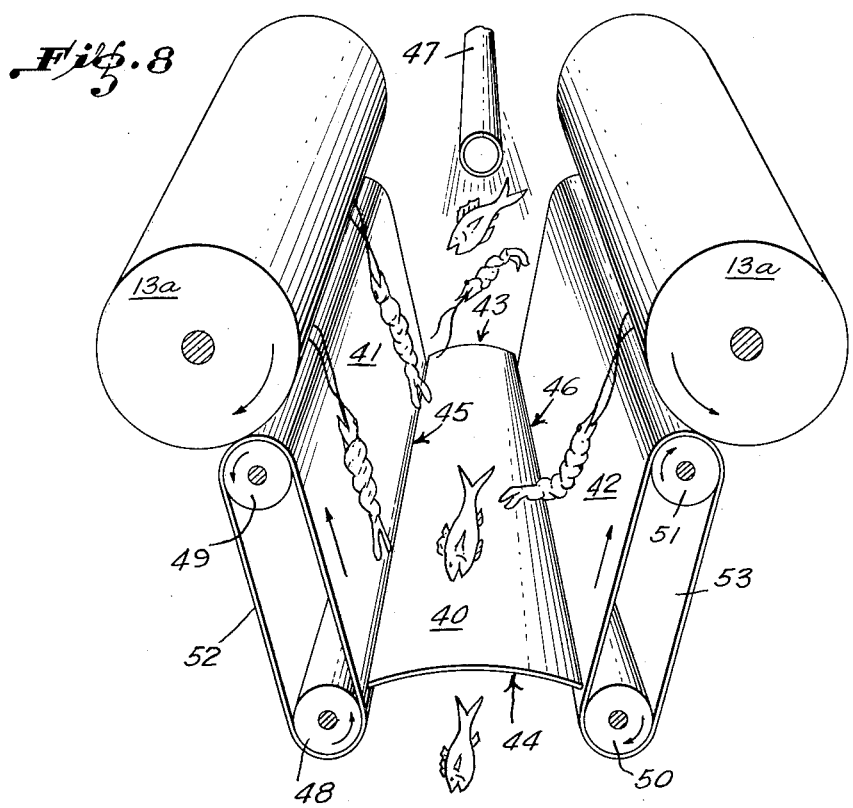
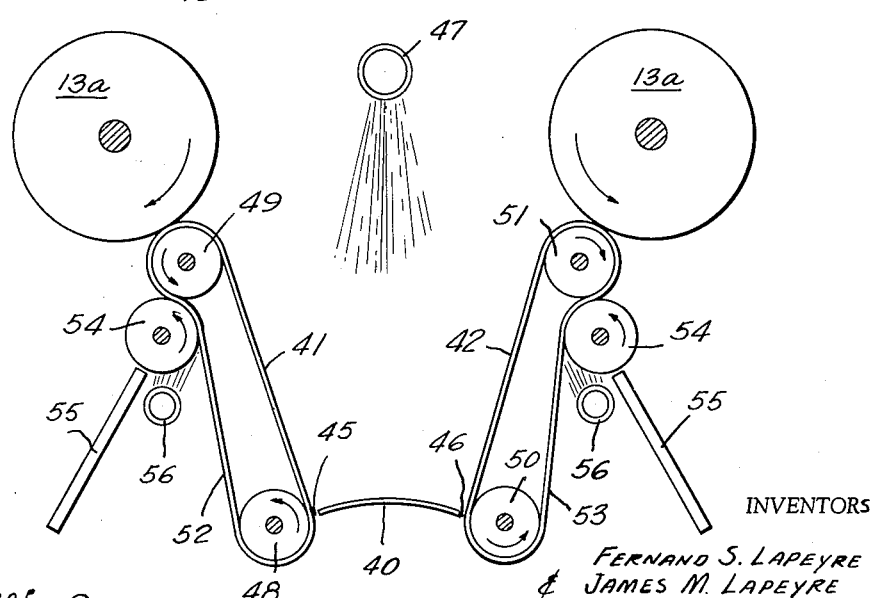
INVENTORS
FERNAND S. LAPEYRE
& JAMES M. LAPEYRE
BY
ATTORNEYS United States Patent Office 3,020,583
Patented Feb. 13, 1962

3,020,583
APPARATUS FOR SEPARATING SHRIMP FROM A MIXED CATCH AND/OR REMOVING THE SHRIMP HEADS
Fernand S. Lapeyre and James M. Lapeyre, New Orleans, La., assignors to The Peelers Company, Houma, La., a partnership
Filed Sept. 23, 1957, Ser. No. 685,597
10 Claims. (Cl. 17—2)

The present invention relates to apparatus for separating shrimp from a mixed catch and/or removing the shrimp heads, and an object of the invention is to take advantage of a characteristic of the shrimp that fish, crabs and other members of a mixed catch do not possess, that is the whiskers, sometimes called feelers or antennae, of shrimp, provision being made for grasping the whiskers and thereby withdrawing the shrimp from the mixed catch.

Another object of the invention is to provide a process and apparatus for the purpose stated in which the shrimp, among other members of the catch, are subjected to an initial orienting device which selectively acts upon the whiskers of the shrimp, the other members of the catch being unaffected thereby, with the result that the whiskers are lead to a removal device by which the shrimps are pulled or otherwise moved from the catch and delivered to a separate destination.

The invention has for a further purpose and object to provide an addendum device which may be optionally added to the separating apparatus which will perform the further operation upon the shrimp of headlessing or deheading the shrimp.

It is a still further object of the invention to provide a deheader attachment for the shrimp separating machine without involving any change in the form of the separating machine, and which will also operate upon the shrimp through the whisker characteristic thereof.

It is a still further object of the invention to provide a simple form of apparatus and a simply practiced process, the steps of which are few and simple, with the deheading step being performed in continuity with the separating step.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is an isometric view of an apparatus for separating shrimp from a mixed catch as constructed in accordance with the present invention.

FIGURE 2 is a diagrammatic view, taken on an enlarged scale, showing one form of device for carrying out the invention.

FIGURE 3 is a similar view showing the shrimp and other members of the catch in an advanced position over FIGURE 2.

FIGURE 4 is a fragmentary vertical sectional view through a slightly modified form of the invention.

FIGURE 5 is an isometric view showing the form of the deheader according to the invention applied to the separating machine as an attachment therefor.

FIGURE 6 is a diagrammatic isometric end view taken on an enlarged scale of the roller assemblies and illustrating the process and principle of operation of the apparatus shown in FIGURE 5.

FIGURE 7 is a fragmentary vertical section view of a modified form of the combined separating machine and headremover showing shrimp in the act of passing therethrough.

FIGURE 8 is an isometric view of a further modified form of apparatus for separating the shrimp from a mixed catch.

FIGURE 9 is a vertical sectional view taken through the apparatus of FIGURE 8 to which has been added a deheading attachment.

Referring more particularly to the drawings and for the present to FIGURES 1, 2 and 3 thereof, a shrimp separating machine is herein illustrated in which a frame 10 of any suitable construction is provided, preferably having an inclined upper portion for receiving the bearings 11 in which the trunnions 12 of resilient rollers 13 are journaled for rotation of such rollers 13. The rollers are preferably smooth and soft and necessarily deformable. These rollers 13 are preferably of a soft sponge rubber of a character to permit the shrimp to deform the same without injury to such shrimp.

Slick rollers 14 are also journaled in the frame upon the shafts 15, 16. One of the shafts, for instance shaft 15 carries fixedly thereon a pulley or sprocket 17 engaged with a belt or chain from an electric motor or other source of power whereby the rollers may be rotated.

As appears from FIGURE 1 the two shafts 15, 16 are connected together for rotation in opposite directions by intermeshing pinions 19, 20. Appropriate bearings 21, 22 are provided for the shafts 15, 16 mounted at desirable parts of the frame 10.

A pipe 23 in communication with a source of water or other liquid supply runs beneath the crotch of the slick rollers 14 and has a valve 24 for regulating the supply of such liquid. The pipe 23 is provided with apertures 25 so disposed that the liquid will issue therefrom in jet form against the undersides of the slick rollers 14 for the purpose of washing the same.

It will be noted from FIGURE 1 that due to the inclination of the upper portion of the frame 10, the rollers 13 and 14 are disposed with their axes inclined and with the rollers 14 at a lower level than the rollers 13 thus creating an inclined channel down which the mixed catch may slide gravitationally from a feed hopper 26 disposed above the upper end of the channel.

Due to their curvatures, the lower slick rollers 14 also provide above the crotch thereof an inclined trough at the central base portion of the channel to which the mixed catch will gravitate.

At the lower end of the trough is a chute or a discharge apron 27 for the fish and trash or generally for all other members of the mixed catch than the shrimp. One or more baskets 28 or the like may be provided for catching the shrimp which are withdrawn from the trough and from the mixed catch as hereinafter described.

Shrimp going through the machine are indicated at 29, fish at 30 and crabs at 31. The whiskers, feelers, or antennae, of the shrimp are represented at 32.

This form of machine operates in the following manner:

Fish, crabs and the like, together with shrimp, travel down the trough of the inclined rollers 14 which are kept wet by the jets from the pipe 23 to provide a viscous plastic film-like lubricated surface. The rollers 13 and 14 are rotated from the source 17, 18 or otherwise in the direction of the arrows. It is not necessary that the slick wet rollers 14, which may be of metal, be in contact at the crotch, as these rollers are shown as being independently driven by the mechanism shown in FIGURE 1.

However, it is necessary that the rollers 13 be in contact with their respective slick rollers 14 because the nips between the respective roller pairs 13, 14 must be sufficiently forceful to grab the whiskers 32 of the shrimp and pull the shrimp through these nips. Lacking long whiskers, the fish, crabs and other members of the catch will slide down the trough formed by the slick rollers 14 and eventually be delivered to the chute or apron 27 which is arranged at the ends of the rollers. However, in the case of the shrimp, the whiskers will adhere or stick to the wet slick rollers 14 and such whiskers 32 are carried up and over the slick rollers 14 to be engaged by the resilient rollers 13. As the shrimp are drawn between the slick roller and the resilient roller, the resilient roller compresses or deforms in order to conform to the shape of the shrimp to allow passage of undamaged shrimp.

In FIGURE 2, the whiskers 32 of shrimp 29 are shown as adhering to the surfaces of the wet rollers 14. This is accomplished by the principle of adhesion, surface tension and capillary attraction. As these rotating wet rollers or drums 14 wipe against the whiskers 32 they will elevate or raise the whiskers to a point on the periphery of the drums or rollers 14 where the resilient rollers 13 make contact with such rollers 14. This point of contact or nip 14' may be sufficiently strong so that the rotation of the rollers 14 communicate rotary motion to the rollers 13 by the frictional engagement. The whiskers 29 are thereby pinched or firmly grasped in the nips between the rollers 13, 14 and the shrimp 29 are thereby pulled or lifted from the flow of fish and shrimp which are passing through the machine.

In FIGURE 3, at the right hand side of the machine, the body of a shrimp 29 is shown as passing through this nip with the resilient roller 13 being deformed to allow the passage of the shrimp body without any crushing, mutilation or damage thereof. The shrimp 29 are delivered to the baskets 28 which are below the nips referred to so that the shrimp are separated from the remainder of the catch which passes down to the chute 27.

As will be observed, particularly from FIGURES 2 and 3, the wet slick rollers 14 rotate in opposite directions with their near sides, which form the trough, moving in opposite directions upwardly or in an ascending scale. These near sides of the wet slick rollers, being in constant rotation, provide initial orienting surfaces exposed over the entire area and length of the trough for presenting to the shrimp moving down the trough means for straightening out the whiskers and elongating the whiskers in the direction of the nips between the rollers 13, 14 so that there will be ample opportunity for all shrimp traveling down the long trough to have their whiskers properly oriented and presented and elevated to the grasping nips which thereupon will pull the shrimp bodies by means of the whiskers upwardly over the wet slick rollers 14 which are rotated in a direction to aid this end and object. Also the rollers 13 being rotated in an opposite sense with respect to their companion rollers 14 will cooperate to pull the whiskers and eventually the bodies of the shrimp through the nips.

It will be understood that it is not necessary to arrange the axes of the various rollers on an inclination as the same may be parallel and horizontal and the catch may be sluiced with water or other liquid along the trough and channel.

Referring more particularly to FIGURE 4, a modified form of the device shows a unit as consisting of a single pair of the rollers 13', 14' in combination with a plate 33. This plate is preferably smooth and inclined so that it forms with the near side of the roller 14' a trough down which the mixed catch may be delivered from the feed hopper 26.

The operation of this form of the invention is precisely the same as that described with reference to the form of invention shown in FIGURES 1 to 3 inclusive. In other words all members of the mixed catch slide down the trough and are delivered to the chute 27 at the end of the trough; while the whiskers of the shrimp adhere to the surface of the wet slick roller 14' and are thereby carried to the nip between the rollers 13' and 14' so that the shrimp is lifted or pulled out of the trough and delivered to the baskets which are below the lower side of the nip. FIGURE 4 shows a shrimp going through the nip with the upper roller 13' being correspondingly deformed. This deformation will of course be accompanied by a setting up of elastic stresses within the rubber or other elastic body of the roller 13', with the result that when the shrimp has passed through the nip, the body of the roller 13' will regain its normal form. This will be necessary to provide the normal grip between rollers 13' and 14' at the nip so as to exert a proper grasp and pull upon the shrimp.

Referring more particularly to the form of invention shown in FIGURES 5 and 6, no change whatever is made in the separating machine, and similar parts having been given identical reference characters. These FIGURES 5 and 6 simply show that an attachment has been added to the separating machine to perform a deheading function.

The attachment consists in head crushing rollers 34 journaled to rotate in bearings 35 having appropriate support from the frame 10 and being in frictional contact with lower outside portions of the rollers 14" so as to form head pinching nips between the rollers 14" and 34. Extending off of lower outer portions of the rollers 34 are deflector plates or walls 36 which are supported by brackets 37 or otherwise from the frame 10.

In the operation of this deheading machine, the action of the separating parts of the machine is as heretofore described. After passing through the nips between the rollers 13", 14", the whiskers are further carried around by adhesion to the rollers 14" and thereby lead to the nips between the rollers 14" and 34. While the shrimp tail is still held by the resilient roller 13", the head is engaged by the head crushing roller 34. The heads are thus crushed from the bodies before the tail is freed from the first nip between the rollers 13", 14". The shrimp bodies, minus the heads, which are shown at 29a are delivered to the deflectors 36 and slide down the same to a proper receptacle or destination. The heads 29b together with the feelers 32 pass through the nips between the rollers 14" and 34 and are delivered separately on the insides of the deflector walls 36.

Referring more particularly to FIGURE 7, an arrangement such as shown in FIGURE 4 is here illustrated in which an inclined smooth plate 33a is employed in conjunction with a single roller 14 to constitute the trough. The device is otherwise as described both constructionally and as a matter of operation in connection with the form of invention illustrated in FIGURES 5 and 6. The spray or jets from the pipe 23 may in addition to wetting the roller or rollers 14''' be also directed against the head crushing rollers 34 whereby the heads may be washed off by suitable spray.

All surfaces of the rollers 14, 13 and 34 are preferably smooth or at least are not of a brush form having bristles. When a brush is employed it depends on a combing action to overcome the weight of the shrimp and lift it out from the fish. In the case of the present invention there is a positive mechanical binding of the whiskers to the roller 14 and between the rollers 13, 14. Also the brush tends to retard the longitudinal movement of the shrimp and also of the fish through the trough. With the smooth surface rolls of the present invention the progress of the mixed catch through the machine is continuous and rapid thus adding to the capacity of the machine. Also the smooth rollers admit of easy cleaning compared to the bristles of a brush.

Also the present separating machine lends itself to the possibility of becoming a deheader with the simple addition of a third roller 34.

The rollers 14 become slick by reason of the wetting or lubrication thereof from the liquid sprays or jets. The liquid adheres to the surfaces of the rollers 14 in the form of film varying in thickness from time to time. By reason of cohesion the liquid film is carried around with the rollers. Liquids also have a viscosity coefficient. The liquid film wets the whiskers of the shrimp which causes the whiskers to go limp and lie flat on the surface of a roller with which such whiskers chance to contact. The whiskers will tend to elongate when wet and due to adhesion, cohesion, surface tension and capillary attraction the whiskers will be entrained to move with the rollers up the curved surfaces thereof toward the nips between rollers 13, 14. In so moving the whiskers are oriented lengthwise to a right line position at substantially right angles to the direction of the trough and in a straight line toward the grasping and pulling nip between the rollers 13, 14. The distance between the trough and nip is preferably calculated to be such that the free tip of a whisker will arrive at and be caught in the nip before the body of the shrimp is entrained in the same movement. Thus the inertia of the body will not have to be overcome alone by the film attachment of the whisker but the pressure of the elastic roller 13 will be interposed to pick up the weight of the shrimp body and pull the whisker and its body through the nip.

The wetted surface is illustrated by way of example as a roller surface but any moving wet surface may suffice, and the grasping nip may take other mechanical forms provided that the whisker is caught and the shrimp without damage is pulled out of the trough and deposited separately from other members of the mixed catch.

Referring more particularly to FIGURES 8 and 9, 40 designates a chute bed or plate, for instance of sheet metal, having preferably a slight crown with the convexity uppermost, this plate being inclined from end to end and forming with the inner runs 41 and 42 of endless belts a trough or channel down which the mixed catch moves from the higher induction end 43 to the lower discharge end 44.

Spaces 45 and 46 are left between the side edges of the plate 40 and the belt runs 41 and 42 to induce water or other liquid, received from supply pipe 47, to flow against and wet the belts which have preferably smooth surfaces, for instance of rubber, rubber composition, canvas or the like, to which the whiskers of shrimp will adhere.

The belts run about pairs of rollers 48, 49 and 50, 51, each pair spaced substantially vertically with the upper rollers 49, 51 disposed outwardly of the lower rollers 48, 49 with the inner runs 41, 42 of the belts being driven upward and forming preferably upwardly-diverging side walls for the trough or channel.

The soft or sponge rollers 13ª form grasping and pulling nips with the upper rollers 49, 51 with the belts running through the nips. The outer runs of the belts are indicated at 52 and 53.

In FIGURE 9 hard rollers 54 are engaged with the outer runs 52 and 53 of the belts and through the belts with the upper belt rollers 49, 51 to form bights for crushing the heads of shrimp and pinching the heads from the bodies which are guided down the inclined deflector plates 55 while the crushed heads are pulled with the whiskers through the last named bights. Spray or jet pipes 56, in communication with a source of liquid supply, lubricate and cleanse the rollers 54 and the belts.

The advantage of the belts over the rollers 14 of FIGURE 1 is that by separating the belt rollers to desired distance and heights the depth of the trough or channel may be increased to the point where fish and other non-whiskered members of the mixed catch will not be lifted, no matter what their size, to the rollers 13ª. A completely effective separation results.

Although we have disclosed herein the best form of the invention known to use at this time, we reserve the right to all such modifications and changes as may come within the scope of the following claims.

What is claim is:

1. A device for separating heads-on shrimp having long whiskers from a mixed catch comprising a moving member having a wetted surface to which the catch is indiscriminately subjected and to which will selectively adhere only the whiskers of the shrimp, and whisker grasping and pulling means so operatively associated with the member as to receive the whiskers therefrom and remove the entrained shrimp from the catch.

2. A device according to claim 1 further comprising wetting means so positioned relatively to the member as to supply a liquid to the surface thereof.

3. A device according to claim 1 in which the member is a roller, with means connected to rotate the same.

4. A device according to claim 1 in which the grasping and pulling means is an elastic deformable roller forming a nip with the member and so operatively associated therewith as to exert elastic pressure against said surface.

5. A device according to claim 1 further comprising shrimp deheading means operatively associated with the grasping and pulling means to receive the whiskers from the latter means and remove the heads from the shrimp.

6. A device according to claim 1 in which the member is a wet roller and the grasping and pulling means a resilient soft roller bearing with resilient pressure against the first-named roller to form a nip therewith to receive the whiskers and subsequently the shrimp bodies therethrough.

7. A device according to claim 5 in which the deheading means is a hard roller forming a bight with said surface.

8. A device according to claim 6 further comprising a hard deheading roller related to the wet roller to form a bight therewith at a point displaced angularly from said nip formed by the wet and resilient rollers, with a dividing plate inclining outwardly from the deheading roller positioned to receive the deheaded shrimp bodies.

9. An apparatus for separating heads-on shrimp having long whiskers from a mixed catch of fish and shrimp comprising receiving and distributing means positioned to receive and distribute the mixed catch, shrimp whisker orienting means having a viscous plastic film-like lubricated surface positioned to act upon the whiskers of the shrimp in said receiving and distributing means, and shrimp removal means positioned to grasp the oriented shrimp whisker and separate the shrimp from the mixed catch.

10. A device for separating heads-on shrimp having long whiskers from a mixed catch of fish and shrimp comprising a trough for receiving the mixed catch, a member moving upwardly in the trough and having a smooth surface to which the whiskers of shrimp will adhere so as to be raised and straightened incident to the upwardly moving member, and whisker grasping and pulling means situated at an elevation above the trough and positioned to receive the upper ends of the shrimp whiskers for lifting the bodies of the shrimp from the mixed catch in the trough.

References Cited in the file of this patent

UNITED STATES PATENTS

| | | |
|---|---|---|
| 469,252 | Jessup | Feb. 23, 1892 |
| 478,469 | Rudasill | July 5, 1892 |
| 741,956 | Burnett et al. | Oct. 20, 1903 |
| 900,189 | Morral et al. | Oct. 6, 1908 |
| 1,397,141 | Nourse | Nov. 15, 1921 |
| 1,711,817 | Stoner | May 7, 1929 |
| 2,062,946 | Sorensen | Dec. 1, 1936 |
| 2,663,900 | Greiner et al. | Dec. 29, 1953 |
| 2,712,152½ | Samanie | July 5, 1955 |
| 2,772,776 | Myron | Dec. 4, 1956 |
| 2,794,209 | Self | June 4, 1957 |